US008178167B2

(12) United States Patent
Walther et al.

(10) Patent No.: US 8,178,167 B2
(45) Date of Patent: May 15, 2012

(54) VOC-FREE OR VOC-POOR POLYURETHANE COATING

(75) Inventors: Burkhard Walther, Garching an der Alz (DE); Urs Burckhardt, Zurich (CH); Susanne Strauss, Stuttgart (DE); Carsten Zilg, Korntal-Munchingen (DE); Norman Blank, Ruschlikon (CH)

(73) Assignee: Sika Technology AG, Baar (CH)

( * ) Notice: Subject to any disclaimer, the term of this patent is extended or adjusted under 35 U.S.C. 154(b) by 483 days.

(21) Appl. No.: 12/308,513

(22) PCT Filed: Jun. 29, 2007

(86) PCT No.: PCT/EP2007/056599
§ 371 (c)(1),
(2), (4) Date: Jan. 22, 2009

(87) PCT Pub. No.: WO2008/000831
PCT Pub. Date: Jan. 3, 2008

(65) Prior Publication Data
US 2010/0009076 A1    Jan. 14, 2010

(30) Foreign Application Priority Data
Jun. 30, 2006  (EP) .................................... 06116396

(51) Int. Cl.
*B05D 3/04* (2006.01)
(52) U.S. Cl. ..................... 427/377; 427/384; 427/385.5; 427/388.1; 427/393; 427/395.6; 427/393.5; 525/456; 525/457; 528/59
(58) Field of Classification Search .................. None
See application file for complete search history.

(56) References Cited

U.S. PATENT DOCUMENTS

| | | | | |
|---|---|---|---|---|
| 3,420,800 A | * | 1/1969 | Haggis ............................. | 528/59 |
| 4,456,718 A | * | 6/1984 | Brinkmann et al. .......... | 524/114 |
| 4,469,831 A | * | 9/1984 | Bueltjer et al. ................ | 524/112 |
| 4,720,535 A | * | 1/1988 | Schleier et al. ................ | 528/59 |
| 4,916,199 A | * | 4/1990 | Bandlish et al. ................ | 528/28 |
| 5,010,161 A | * | 4/1991 | Aoki et al. ....................... | 528/59 |
| 6,552,155 B1 | * | 4/2003 | Gutman et al. ................. | 528/68 |
| 2005/0065276 A1 | | 3/2005 | Burckhardt et al. | |
| 2006/0052522 A1 | | 3/2006 | Burckhardt et al. | |
| 2006/0122352 A1 | | 6/2006 | Burckhardt | |
| 2006/0149025 A1 | | 7/2006 | Burckhardt | |
| 2007/0004893 A1 | | 1/2007 | Burckhardt et al. | |
| 2007/0129522 A1 | | 6/2007 | Burckhardt et al. | |

FOREIGN PATENT DOCUMENTS

| | | |
|---|---|---|
| EP | 1 524 282 A1 | 4/2005 |
| WO | WO 03/059977 A1 | 7/2003 |
| WO | WO 03/059978 A1 | 7/2003 |
| WO | WO 2004/013088 A1 | 2/2004 |
| WO | WO 2004/013200 A1 | 2/2004 |

OTHER PUBLICATIONS

"Methoden der Organischen Chemie," Houben-Weyl, 1952, vol. VIII, pp. 516-528.

* cited by examiner

*Primary Examiner* — Erma Cameron
(74) *Attorney, Agent, or Firm* — Oliff & Berridge, PLC

(57) ABSTRACT

The invention relates to humidity hardening compounds containing at least one polyurethane polymer, P, exhibiting an isocyanate group, at least one polyimine ALD of Formula (I) of at least 22% by weight, in relation to the sum of the components of the compound which contain the isocyanate group, as well as, if necessary, a polyisocyanate oligomer OP. The humidity hardening compound is particularly suitable for providing coatings and linings. The use of the imines makes possible VOC-free or VOC-poor compounds, which is a substantial advantage for indoor applications.

32 Claims, No Drawings

VOC-FREE OR VOC-POOR POLYURETHANE COATING

FIELD OF THE INVENTION

The present invention pertains to the field of one-component moisture-curing polyurethane compositions, and also to their use, especially as an elastic coating.

DESCRIPTION OF THE PRIOR ART

One-component moisture-curing polyurethane compositions and their use as elastic coatings are known. These compositions are based on oligomers and/or polymers containing isocyanate groups, and have a relatively high intrinsic viscosity. In order nevertheless to achieve good processing properties, especially a high fluidity, significant amounts of volatile organic solvents are commonly added to the compositions, typically at between 10% and 20% by weight. In order for the compositions to cure without bubbles they are usually also admixed with what are called "latent curing agents"; these are substances which only on ingress of moisture, in a hydrolysis reaction, release the actual curing agent, which usually contains amine groups and/or alcohol groups, and then react with the isocyanate groups without formation of carbon dioxide gas. Many of these latent curing agents reduce the storage stability of the compositions and in the course of the curing reaction release volatile, intensely odorous aldehydes, such as isobutyraldehyde or benzaldehyde. The application of a composition of this kind to a flat surface, in the form of a coating, leads to the release of large quantities of volatile organic compounds (VOC), resulting in intense formation of odor and having the capacity to disrupt users and/or residents and to jeopardize health. Application in interior spaces is not an option in the majority of cases. The increasing regulation of the release of VOC is additionally restricting the use of such compositions, and making them more expensive. Reducing the VOC content, by means, for example, of substituting less volatile for more volatile solvents, or by means of plasticizers, leads generally to coatings having inadequate properties, particularly in respect of strength and resistance.

Existing low- or no-VOC polyurethane coatings are therefore, as a general rule, two-component formulations. As a result of their comparatively high level of monomeric or oligomeric, comparatively low molecular weight, reactive components, they have a significantly lower viscosity and can therefore be processed effectively even without addition of VOC. A precondition for the two-component system, however, is that the mixing of the two components is complete and that the mixing ratio and pot life are preserved; if not, the coating obtained is mechanically inadequate or unresistant, inhomogeneous, and uneven in its curing through volume. Complying with these conditions is often problematic in practise, which is why one-component systems are preferred by the user.

WO 2004/013200 A1 discloses one-component, odorlessly curing polyurethane compositions comprising specific odorless polyaldimines. These compositions have a high intrinsic viscosity.

SUMMARY OF THE INVENTION

It is an object of the present invention, therefore, to provide a VOC-free or low-VOC, one-component composition which can be used as an elastic polyurethane coating, which has good storage stability, and which is of sufficiently low viscosity to exhibit good processing properties, which cures under the influence of moisture without a nuisance odor, and which in the cured state possesses sufficiently high hardness in tandem with good elasticity.

It has been found that a composition described herein exhibits the desired properties.

Surprisingly, as a result of the high level of specific odorless polyaldimines, the composition is diluted to such an extent that, even without further diluent additions, such as volatile organic solvents, it possesses good processing properties, in particular a high fluidity, and is outstandingly suitable for application as an elastic polyurethane coating, especially as a floor covering.

DESCRIPTION OF THE PREFERRED EMBODIMENTS

The present invention can provide a moisture-curing composition comprising
a) at least one polyurethane polymer P containing isocyanate groups,
b) at least one polyaldimine ALD of the formula (I), and

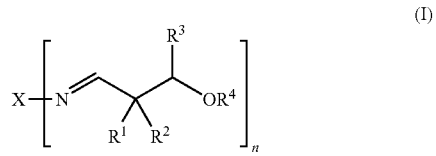

c) optionally, an oligomeric polyisocyanate OP.

In formula (I), X is the organic radical of an n-functional polyamine having a molecular weight of not more than 300 g/mol, following removal of all of the $NH_2$ groups, and this organic radical does not contain any moieties which in the absence of water are reactive with isocyanate groups, especially no hydroxyl groups, no secondary amino groups, no urea groups, and no other groups with active hydrogen.

n is 2 or 3 or 4.

$R^1$ and $R^2$ independently of one another
    either are each a monovalent hydrocarbon radical having 1 to 12 C atoms,
    or together are a divalent hydrocarbon radical having 4 to 20 C atoms which is part of an unsubstituted or substituted carbocyclic ring having 5 to 8, preferably 6, C atoms.

$R^3$ is a hydrogen atom or is an alkyl or arylalkyl group.

$R^4$
    either is a hydrocarbon radical which has 11 to 30 C atoms and optionally contains heteroatoms,
    or is a radical of the formula (II)

where $R^5$
    alternatively is a linear or branched alkyl radical having 11 to 30 C atoms, optionally with cyclic fractions and optionally with at least one heteroatom, especially oxygen in the form of ether, ester or aldehyde groups,
    or is a singly or multiply unsaturated, linear or branched hydrocarbon radical having 11 to 30 C atoms, or is an unsubstituted or substituted aromatic or heteroaromatic 5- or 6-membered ring.

The fraction of the polyaldimine ALD is at least 22% by weight, preferably at least 25% by weight, more preferably at least 30% by weight, based on the sum of the constituents of the composition that contain isocyanate groups.

The moisture-curing composition is especially suitable as a VOC-free or low-VOC, odorlessly curing, self-leveling elastic coating, preferably for floors.

The term "polymer" in the present document embraces on the one hand a collective of macromolecules which, while being chemically uniform, differ in respect of degree of polymerization, molar mass, and chain length, and prepared by means of a polymerization reaction (addition polymerization, polyaddition, polycondensation). On the other hand the term also embraces derivatives of such a collective of macromolecules from polymerization reactions, in other words compounds which have been obtained by reactions, such as additions or substitutions, for example, of functional groups on existing macromolecules and which may be chemically uniform or chemically nonuniform. The term further embraces what are called prepolymers, in other words reactive oligomeric preadducts whose functional groups have participated in the synthesis of macromolecules.

The term "polyurethane polymer" embraces all polymers which are prepared by the process known as the diisocyanate polyaddition process. This also includes those polymers which are virtually or entirely free of urethane groups. Examples of polyurethane polymers are polyether-polyurethanes, polyester-polyurethanes, polyether-polyureas, polyureas, polyester-polyureas, polyisocyanurates, and polycarbodiimides.

The "polyamine", here and below, identifies aliphatic primary polyamines, i.e., polyamines having exclusively primary amino groups ($NH_2$ groups) which are attached to an aliphatic, cycloaliphatic or arylaliphatic radical which optionally contains heteroatoms. They are therefore different from the aromatic primary polyamines which contain $NH_2$ groups attached to an aromatic or heteroaromatic radical, such as in diaminotoluene, for example.

The term "volatile organic compound", "VOC" for short, stands for a compound having a vapor pressure of at least 0.01 kilopascals at 293.15 kelvins.

The term "solvent" stands for a liquid volatile organic compound, in other words for a VOC, in which a polyurethane polymer containing isocyanate groups is soluble, and which contains no groups reactive with isocyanate groups, more particularly no hydroxyl groups, amino groups, urea groups or other groups with active hydrogen.

The terms "coating" and "covering" are used for curable polymer compositions which have been applied two-dimensionally and in a film thickness of at least 0.1, especially 0.5 mm, preferably 1-2 mm.

The moisture-curing composition comprises at least one polyurethane polymer P containing isocyanate groups.

The polyurethane polymer P is obtainable for example from the reaction of at least one polyisocyanate with at least one polyol. This reaction may take place by the polyol and the polyisocyanate being reacted by typical techniques, at temperatures of 50° C. to 100° C. for example, where appropriate with the accompanying use of suitable catalysts, the polyisocyanate being metered such that its isocyanate groups are present in a stoichiometric excess in relation to the hydroxyl groups of the polyol. Advantageously the polyisocyanate is metered so as to observe an NCO/OH ratio of 1.5 to 5, more particularly one of 1.8 to 3. The NCO/OH ratio here means the ratio of the number of isocyanate groups employed to the number of hydroxyl groups employed. Preferably, after all of the hydroxyl groups of the polyol have reacted, a free isocyanate group content of 0.5% to 15% by weight, more preferably of 3.5% to 10% by weight, remains in the polyurethane polymer P.

Examples of polyols which can be used for the preparation of a polyurethane polymer P are the following commercially customary polyols or mixtures thereof:

polyoxyalkylenepolyols, also called polyetherpolyols or oligoetherols, which are polymerization products of ethylene oxide, 1,2-propylene oxide, 1,2- or 2,3-butylene oxide, tetrahydrofuran or mixtures thereof, possibly polymerized by means of a starter molecule having two or more active hydrogen atoms, such as water, ammonia or compounds having two or more OH or NH groups such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the aforementioned compounds. Use may be made both of polyoxyalkylenepolyols which have a low degree of unsaturation (measured according to ASTM D-2849-69 and reported in milliequivalents of unsaturation per gram of polyol (meq/g)), prepared for example with the aid of what are known as double metal cyanide complex catalysts (DMC catalysts), and of polyoxyalkylenepolyols having a higher degree of unsaturation, prepared for example by means of anionic catalysts such as NaOH, KOH, CsOH or alkali metal alkoxides.

Particular suitability is possessed by polyoxyalkylenediols or polyoxyalkylenetriols, more particularly polyoxypropylenediols or polyoxy-propylenetriols.

Especially suitable are polyoxyalkylenediols or polyoxyalkylenetriols having a low viscosity and having a molecular weight in the range of 400-8000 g/mol.

Likewise particularly suitable are polytetrahydrofurans, on account of their good light stability.

Likewise particularly suitable are what are known as ethylene oxide-terminated ("EO-endcapped", ethylene oxide-endcapped) polyoxypropylenepolyols. The latter are specific polyoxypropylene-polyoxy-ethylene-polyols which are obtained, for example, by subjecting pure polyoxypropylenepolyols, more particularly polyoxypropylenediols and -triols, after the end of the polypropoxylation reaction, to further alkoxylation with ethylene oxide and which as a result contain primary hydroxyl groups.

Styrene-acrylonitrile- or acrylonitrile-methyl methacrylate-grafted polyetherpolyols.

Polyesterpolyols, also called oligoesterols, prepared for example from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, and also polyesterpolyols formed from lactones such as ε-caprolactone, for example.

Polycarbonatepolyols of the kind obtainable by reacting, for example, the abovementioned alcohols—those used to synthesize the polyesterpolyols—with dialkyl carbonates, diaryl carbonates or phosgene.

Polyacrylatepolyols and polymethacrylatepolyols.

Polyhydrocarbonpolyols, also called oligohydrocarbonols, such as, for example, polyhydroxy-functional ethylene-propylene, ethylene-butylene or ethylene-propylene-diene copolymers, of the kind prepared, for example, by the company Kraton Polymers, or polyhydroxy-functional copolymers of dienes such as 1,3-butanediene or diene mixtures and vinyl monomers such as styrene, acrylonitrile or isobutylene, or polyhydroxy-functional poly-butadienepolyols, such as those, for example, which are prepared by copolymerization of 1,3-butadiene and allyl alcohol and which may also have been hydrogenated.

Polyhydroxy-functional acrylonitrile/polybutadiene copolymers of the kind preparable, for example, from epoxides or amino alcohols and carboxyl-terminated acrylonitrile/polybutadiene copolymers (available commercially under the name Hycar® CTBN from Noveon).

These stated polyols preferably have an average molecular weight of 250-12 000 g/mol, more particularly of 400-8 000 g/mol, and preferably have an average OH functionality in the range from 1.7 to 3.

Further to these stated polyols it is possible to use small amounts of low molecular weight dihydric or polyhydric alcohols such as, for example, 1,2-ethanediol, 1,3- and 1,4-butanediol, 1,2- and 1,3-propanediol, neopentyl glycol, diethylene glycol, triethylene glycol, the isomeric dipropylene glycols and tripropylene glycols, the isomeric pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other polyhydric alcohols, low molecular mass alkoxylation products of the aforementioned dihydric and polyhydric alcohols, and also mixtures of the aforementioned alcohols, in preparing a polyurethane polymer P. Small amounts of polyols with an average OH functionality of more than 3 can be used as well, examples being sugar polyols.

As polyisocyanates for the preparation of a polyurethane polymer P it is possible to make use of commercially customary aliphatic, cycloaliphatic or aromatic polyisocyanates, more particularly diisocyanates, examples being the following:

Diisocyanates having isocyanate groups attached to in each case one aliphatic, cycloaliphatic or araliphatic C atom, also called "aliphatic diisocyanates", such as 1,6-hexamethylene diisocyanate (HDI), 2-methylpenta-methylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3- and 1,4-diisocyanate and any desired mixtures of these isomers, 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene; and also diisocyanates having isocyanate groups attached to in each case one aromatic C atom, also called "aromatic diisocyanates", such as 2,4- and 2,6-tolylene diisocyanate and any desired mixtures of these isomers (TDI), 4,4'-, 2,4'-, and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI); oligomers and polymers of the aforementioned isocyanates, and also any desired mixtures of the aforementioned isocyanates.

For the formulation of light-stable coatings, aliphatic diisocyanates are preferred, especially HDI and IPDI.

Preferred among the aromatic diisocyanates are MDI and TDI.

The polyols and polyisocyanates are chosen such that a polyurethane polymer P formed from them has a low viscosity. A low-viscosity polyurethane polymer P is especially suitable for obtaining coatings with high fluidity. A "low viscosity" here means a viscosity of not more than 25 Pa·s, more particularly of not more than 20 Pa·s, preferably not more than 15 Pa·s, at 20° C.

Typically the polyurethane polymer P is present in an amount of 10%-80% by weight, preferably in an amount of 15%-70% by weight, based on the overall composition.

The moisture-curing composition comprises further to the polyurethane polymer P at least one polyaldimine ALD of the formula (I) in an amount of at least 22%, preferably at least 25%, more preferably at least 30%, by weight, based on the weight sum of all of the constituents of the composition that contain isocyanate groups.

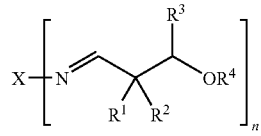

(I)

In formula (I), X is the organic radical of an n-functional polyamine having a molecular weight of not more than 300 g/mol, following removal of all of the $NH_2$ groups, this organic radical containing no moieties which in the absence of water are reactive with isocyanate groups, in particular no hydroxyl groups, no secondary amino groups, no urea groups, and no other groups with active hydrogen.

Preferably X is a hydrocarbon radical, which is optionally substituted, and which optionally contains heteroatoms, more particularly in the form of ether oxygen, tertiary amine nitrogen or thioether sulfur.

n is 2 or 3 or 4, preferably 2 or 3, more preferably 2.

$R^1$ and $R^2$ are independently of one another, firstly, each a monovalent hydrocarbon radical having 1 to 12 C atoms.

Secondly $R^1$ and $R^2$ may together be a divalent hydrocarbon radical having 4 to 20 C atoms which is part of an unsubstituted or substituted carbocyclic ring having 5 to 8, preferably 6, C atoms.

$R^3$ is a hydrogen atom or is an alkyl or arylalkyl group. Preferably $R^3$ is a hydrogen atom.

$R^4$ is either a hydrocarbon radical which has 11 to 30 C atoms and optionally contains heteroatoms, or is a radical of the formula (II),

(II)

where there are three possibilities for the radical $R^5$.

Firstly $R^5$ can be a linear or branched alkyl radical having 11 to 30 C atoms, where appropriate with cyclic fractions, and optionally with at least one heteroatom, more particularly oxygen in the form of ether, ester or aldehyde groups.

Secondly $R^5$ can be a singly or multiply unsaturated, linear or branched hydrocarbon radical having 11 to 30 C atoms.

Thirdly $R^5$ can be an unsubstituted or substituted, aromatic or heteroaromatic, 5- or 6-membered ring.

A polyaldimine ALD is obtainable through a condensation reaction, with elimination of water, between a polyamine of the formula (III) and an aldehyde of the formula (IV), where X, n, and $R^1$, $R^2$, $R^3$ and $R^4$ have the definitions stated above. In this reaction the aldehyde of the formula (IV) is used stoichiometrically or in a stoichiometric excess in relation to the amino groups of the polyamine of the formula (III).

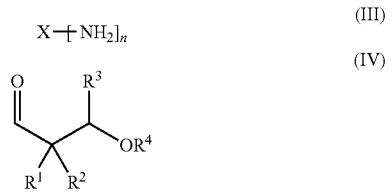

Polyamines of the formula (III) are polyamines having two, three or four aliphatic primary amino groups and having a molecular weight, where appropriate an average molecular weight, of not more than 300 g/mol, preferably not more than 250 g/mol, more preferably not more than 200 g/mol. The radical X contains no moieties which in the absence of water are reacted with isocyanate groups; in particular, X contains no hydroxyl groups, no secondary amino groups, no urea groups, and no other groups with active hydrogen.

An elastic coating, especially a floor covering, of good quality must in the cured state have a relatively high hardness. Through the use of fairly small polyamines of the formula (III), with a molecular weight of not more than 300 g/mol, preferably not more than 250 g/mol, more preferably not more than 200 g/mol, the curing of the composition produces hard segments with urea groups positioned close to one another, and this results, with low stretch, in a relatively high modulus of elasticity and hence a relatively high hardness. When polyamines having a molecular weight higher than 300 g/mol are employed, the high hardness desired for floor coatings is usually not attained. Polyamines particularly suitable for obtaining a high level of hardness are cycloaliphatic diamines, and also aliphatic diamines having an unsubstituted, even-numbered alkylene chain between the amino groups.

Examples of suitable polyamines of the formula (III) are aliphatic polyamines such as ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentanediamine, 1,6-hexamethylenediamine, 2,2,4- and 2,4,4-trimethylhexamethylenediamine and mixtures thereof, 1,7-heptanediamine, 1,8-octanediamine, 4-aminomethyl-1,8-octanediamine, 1,9-nonanediamine, 1,10-decanediamine, 1,11-undecanediamine, 1,12-dodecanediamine, methyl bis(3-aminopropyl)amine, 1,5-diamino-2-methylpentane (MPMD), 1,3-diaminopentane (DAMP), 2,5-dimethyl-1,6-hexa-methylenediamine, cycloaliphatic polyamines such as 1,3- and 1,4-diamino-cyclohexane, bis(4-aminocyclohexyl)methane, bis(4-amino-3-methylcyclohexyl)methane, bis(4-amino-3-ethylcyclohexyl)methane, bis (4-amino-3,5-di-methylcyclohexyl)methane, 1-amino-3-aminomethyl-3,5,5-trimethylcyclohexane (i.e., isophoronediamine or IPDA), 2- and 4-methyl-1,3-diaminocyclohexane and mixtures thereof, 1,3- and 1,4-bis(aminomethyl)cyclohexane, 1-cyclohexyl-amino-3-aminopropane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), 3,9-bis(3-aminopropyl)-2,4,8,10-tetra-oxaspiro[5.5]undecane, 1,3- and 1,4-xylylenediamine, aliphatic polyamines containing ether groups, such as bis(2-aminoethyl)ether, 4,7-dioxadecane-1,10-diamine, 4,9-dioxadodecane-1,12-diamine, polyoxyalkylene-polyamines having theoretically two or three amino groups, examples being Jeffamine® D-230, Jeffamine® XTJ-504 (triethylene glycol diamine), and Jeffamine® XTJ-511 (all three from Huntsman Chemicals). The polyoxyalkylene-polyamines having theoretically two or three amino groups are short-chain and thus have a molecular weight of less than a maximum of 300 g/mol.

Preferred polyamines of the formula (III) are 1,6-hexamethylenediamine, MPMD, DAMP, IPDA, 4-aminomethyl-1,8-octanediamine, 1,3-xylylene-diamine, 1,3-bis(aminomethyl)cyclohexane, bis(4-aminocyclohexyl)methane, bis(4-amino-3-methylcyclohexyl)methane, 3(4),8(9)-bis(aminomethyl)tricyclo-[5.2.1.0$^{2,6}$]decane, 1,4-diamino-2,2,6-trimethylcyclohexane, and also the short-chain polyoxyalkylene-diamines Jeffamine® D-230 (CAS No. 9046-10-0) and Jeffamine® XTJ-504 (CAS No. 929-59-9), and also, in particular, mixtures of two or more of the aforementioned polyamines.

Particular preference is given to 1,6-hexamethylenediamine.

A polyaldimine ALD is prepared using aldehydes of the formula (IV). A feature of these aldehydes is that their radicals $R^1$, $R^2$, $R^3$, and $R^4$ do not contain any moieties which in the absence of water are reactive with isocyanate groups; in particular, $R^1$, $R^2$, $R^3$, and $R^4$ contain no hydroxyl groups, secondary amino groups, urea groups or other groups with active hydrogen.

Suitable aldehydes of the formula (IV) are in a first embodiment aldehydes which carry as radical $R^4$ a hydrocarbon radical which has 11 to 30 C atoms and optionally contains heteroatoms. They constitute ethers of aliphatic, araliphatic or cycloaliphatic 2,2-disubstituted 3-hydroxyaldehydes with long-chain alcohols such as fatty alcohols, for example. Suitable 2,2-disubstituted 3-hydroxyaldehydes are obtainable in turn from aldol reactions, especially crossed aldol reactions, between primary or secondary aliphatic aldehydes, especially formaldehyde, and secondary aliphatic, secondary araliphatic or secondary cycloaliphatic aldehydes, such as 2-methylbutyraldehyde, 2-ethylbutyraldehyde, 2-methylvaleraldehyde, 2-ethylcaproaldehyde, cyclopentanecarboxaldehyde, cyclohexane-carboxaldehyde, 1,2,3,6-tetrahydrobenzaldehyde, 2-methyl-3-phenylpropionaldehyde, 2-phenylpropionaldehyde (hydratropaldehyde) or diphenylacet-aldehyde. Examples to be mentioned include 2,2-dimethyl-3-lauroxypropanal and 2,2-dimethyl-3-stearoxypropanal.

Suitable aldehydes of the formula (IV) in a second embodiment are compounds of the formula (V),

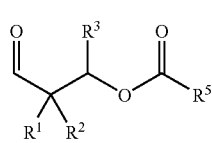

where $R^1$, $R^2$, $R^3$, and $R^5$ have the definitions already stated.

Compounds of the formula (V) constitute esters of the above-described 2,2-disubstituted 3-hydroxyaldehydes, such as, for example, 2,2-dimethyl-3-hydroxypropanal, 2-hydroxymethyl-2-methylbutanal, 2-hydroxymethyl-2-ethylbutanal, 2-hydroxymethyl-2-methylpentanal, 2-hydroxymethyl-2-ethylhexanal, 1-hydroxymethylcyclopentanecarboxaldehyde, 1-hydroxymethylcyclohexanecarboxaldehyde 1-hydroxymethylcyclohex-3-enecarboxaldehyde, 2-hydroxymethyl-2-methyl-3-phenylpropanal, 3-hydroxy-2-methyl-2-phenylpropanal, and 3-hydroxy-2,2-diphenylpropanol, with suitable dicarboxylic acids.

Examples of suitable carboxylic acids are firstly aliphatic carboxylic acids having at least 12 C atoms, such as lauric acid, tridecanoic acid, myristic acid, pentadecanoic acid, palmitic acid, margaric acid, stearic acid, nonadecanoic acid, arachidic acid, palmitoleic acid, oleic acid, erucic acid, linoleic acid, linolenic acid, elaeostearic acid, arachidonic acid, fatty acids from the industrial saponification of natural oils and fats such as rapeseed oil, sunflower oil, linseed oil, olive oil, coconut oil, oil palm kernel oil, and oil palm oil, for example, and also technical mixtures of fatty acids that include such acids. Suitable carboxylic acids are, secondly, aromatic carboxylic acids, examples being benzoic acid or the positionally isomeric tolylic acids, ethyl- or isopropyl- or tert-butyl- or methoxy- or nitrobenzoic acids.

Preferred aldehydes of the formula (V) are 2,2-dimethyl-3-lauroyloxypropanal, 2,2-dimethyl-3-myristoyloxypropanal 2,2-dimethyl-3-palmitoyloxypropanal, 2,2-dimethyl-3-stearoyloxypropanal, and 2,2-dimethyl-3-benzoyloxypropanal, and also analogous esters of other 2,2-disubstituted 3-hydroxyaldehydes.

In one particularly preferred embodiment $R^4$ is a radical of the formula (II), where $R^5$ is selected from the group consisting of phenyl and the $C_{11}$, $C_{13}$, $C_{15}$, and $C_{17}$ alkyl groups.

Particular preference is given to 2,2-dimethyl-3-lauroyloxypropanal.

In one preferred preparation method of an aldehyde of the formula (V) a 2,2-disubstituted 3-hydroxyaldehyde, 2,2-dimethyl-3-hydroxypropanal, for example, which can be prepared, for example, from formaldehyde (or paraformaldehyde) and isobutyraldehyde, where appropriate in situ, is reacted with a carboxylic acid to give the corresponding ester. This esterification may take place without the use of solvents by known methods, as described for example in Houben-Weyl, "Methoden der organischen Chemie", Vol. VIII, pages 516-528.

It is also possible to prepare aldehydes of the formula (V) by carrying out the esterification of a 2,2-disubstituted 3-hydroxyaldehyde using an aliphatic or cycloaliphatic dicarboxylic acid, such as succinic acid, adipic acid or sebacic acid, for example. Corresponding aliphatic or cycloaliphatic dialdehydes are obtained in this way.

As the polyaldimine ALD it is possible to use mixtures of different polyaldimines, including, in particular, mixtures of different polyaldimines formed from different polyamines of the formula (III) and alike or different aldehydes of the formula (IV) or (V). It may certainly be advantageous to use mixtures of polyaldimines ALD formed from mixtures of polyamines of the formula (III) having different values of n.

A feature of polyaldimines ALD is that they are unable to form tautomeric enamines, since they lack a hydrogen substituent in the position a to the C atom of the imino group. Together with polyurethane polymers P, aldimines of this kind form storable mixtures, even in the presence therein of highly reactive aromatic isocyanate groups such as those of TDI and MDI.

A further feature of the polyaldimines ALD is that they are odorless, and also that the aldehyde of the formula (IV) or (V) used in their preparation is odorless.

By an "odorless" substance is meant a substance which is so low in odor that for the majority of human individuals it is impossible to smell, in other words is not perceptible with the nose.

When the composition cures, the aldehyde used to prepare the polyaldimine ALD, i.e., an aldehyde of the formula (IV) or (V), is released. By virtue of the odorlessness of the polyaldimines ALD and of these aldehydes, it is possible to obtain odorlessly curing compositions.

The amount of the polyaldimine ALD in the moisture-curing composition is at least 22%, preferably at least 25%, more preferably at least 30%, by weight, based on the sum of the constituents of the composition that contain isocyanate groups. It should be ensured in this context that the polyaldimine is present in a stoichiometric or substoichiometric amount, relative to the free isocyanate groups of the composition, more particularly in an amount of 0.3 to 1.0, preferably 0.4 to 0.9, more preferably 0.4 to 0.8, equivalent of aldimine groups per equivalent of isocyanate groups.

The polyaldimines ALD, which are generally liquid at room temperature, dilute the polyurethane polymer P surprisingly well. The relatively high level of polyaldimine ALD in the composition therefore leads to coatings having good processing properties, in particular a high fluidity.

Besides the polyurethane polymer P and the polyaldimine ALD, the moisture-curing composition may comprise an oligomeric polyisocyanate OP.

Suitability as the oligomeric polyisocyanate OP is possessed both by aliphatic oligomeric polyisocyanates and by aromatic oligomeric polyisocyanates, and also hybrid aliphatic-aromatic forms, the aliphatic oligomeric polyisocyanates being preferred. Suitable aliphatic oligomeric polyisocyanates OP derive, for example, from the following diisocyanates:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, cyclohexan-1,3- and -1,4-diisocyanate and any desired mixtures of this isomers, 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI), 1,4-diisocyanato-2,2,6-trimethylcyclohexane (TMCDI), m- and p-xylylene diisocyanate (XDI), 1,3- and 1,4-tetramethylxylylene diisocyanate (TMXDI), 1,3- and 1,4-bis(isocyanatomethyl)cyclohexane, preferably HDI and IPDI.

Suitable aromatic oligomeric polyisocyanates OP are derived from the same aromatic diisocyanates as already mentioned for the preparation of a polyurethane polymer P.

Technical forms of these oligomers usually constitute mixtures of substances with different degrees of oligomerization and chemical structures. Suitability is possessed by technical oligomer mixtures which have an average NCO functionality of preferably 2.4 to 4.0 and contain, in particular, isocyanurate, iminooxadiazinedione, uretdione or biuret groups. Additionally there may also be allophanate, carbodiimide, uretonimine or oxadiazinetrione groups present.

Suitable commercially available technical oligomer mixtures of aliphatic diisocyanates are HDI biurets, in the form for example of Desmodur® N 100 and N 3200 (Bayer), Tolonatee HDB and HDB-LV (Rhodia) and Duranate® 24A-100 (Asahi Kasei); HDI isocyanurates, in the form for example of Desmodur® N 3300, N 3600, and N 3790 BA (all from Bayer), Tolonatee HDT, HDT-LV, and HDT-LV2 (Rhodia), Duranate® TPA-100 and THA-100 (Asahi Kasei), and Coronate® HX (Nippon Polyurethane); HDI uretdiones, in the form for example of Desmodur® N 3400 (Bayer); HDI iminooxadiazinediones, in the form for example of Desmodure XP 2410 (Bayer); HDI allophanates, in the form for example of Desmodur® VP LS 2102 (Bayer); and also IPDI isocyanurates, for example, in solution as Desmodur® Z 4470 (Bayer) or in solid form as Vestanat® T1890/100 (Degussa).

Preference is given to the trimers of HDI and/or IPDI, especially the isocyanurates.

One technical oligomer mixture of aromatic diisocyanates is TDI isocyanurate, obtainable for example as Desmodur® IL (Bayer).

Likewise available commercially are mixed aromatic-aliphatic isocyanurates based on TDI/HDI, in the form for example of Desmodur® HL (Bayer).

Usually the oligomeric polyisocyanate OP is present in an amount of 0%-20%, preferably in an amount of 0.5%-20%, more preferably in an amount of 1.0%-15%, by weight, based on the overall composition.

The addition of the oligomeric polyisocyanate OP is advantageous first because it further reduces the viscosity of the composition and second because it raises the hardness of the cured composition on account of its high isocyanate group content and its relatively high average NCO functionality.

The moisture-curing composition advantageously comprises no solvent or up to a maximum of 5% by weight of a solvent L, based on the overall composition.

Examples of suitable solvents L are ketones such as acetone, methyl ethyl ketone, diisobutyl ketone, acetylacetone, mesityl oxide, cyclohexanone, and methylcyclohexanone; esters, examples being acetates such as ethyl acetate, propyl acetate, and butyl acetate, formates, propionates, and malonates such as diethyl malonate; ethers such as dialkyl ethers, ketone ethers and ester ethers, examples being diisopropyl ether, diethyl ether, dibutyl ether, diethylene glycol diethyl ether, and ethylene glycol diethyl ether; aliphatic and aromatic hydrocarbons such as toluene, xylene, heptane, octane, and petroleum fractions such as naphtha, white spirit, petroleum ether, and benzine; halogenated hydrocarbons such as methylene chloride; and N-alkylated lactams such as N-methylpyrrolidone, for example.

Preference is given to xylene, toluene, white spirit, and petroleum fractions in the boiling range from 100° C. to 200° C.

As a self-leveling floor coating, the composition has generally good processing properties owing to the diluent effect of the polyaldimines ALD and to the low viscosity of the polyurethane polymer P even without solvents L. In order to improve the processing properties still further, however, it may be advantageous to add small amounts, of up to 5% by weight, of the aforementioned solvents L.

The composition advantageously comprises at least one filler F. The filler F influences not only the rheological properties of the uncured composition but also the mechanical properties and the surface nature of the cured composition. Suitable fillers F are organic and inorganic fillers, as, for example, natural, ground or precipitated calcium carbonates, which where appropriate are coated with fatty acids, especially stearates, or barytes ($BaSO_4$, also called heavy spar), calcined kaolins, aluminum oxides, aluminum hydroxides, silicas, especially highly dispersed silicas from pyrolysis operations, carbon blacks, especially carbon blacks produced industrially (referred to below as "carbon black"), PVC powders or hollow beads. Preferred fillers are barytes and calcium carbonates, and also flame-retardant fillers such as hydrates or hydroxides, especially of aluminum, preferably aluminum hydroxide.

A suitable amount of filler F is situated, for example, in the range from 10% to 70% by weight, preferably 20% to 60% by weight, based on the overall composition.

It is entirely possible, and may even be of advantage, to use a mixture of different fillers F.

The composition advantageously comprises at least one catalyst K which accelerates the hydrolysis of the aldimine groups and/or the reaction of the isocyanate groups.

Examples of catalysts K which accelerate the hydrolysis of the polyaldimine ALD are organic carboxylic acids, such as benzoic acid and salicylic acid, organic carboxylic anhydrides, such as phthalic anhydride, hexahydrophthalic anhydride, and hexahydromethylphthalic anhydride, silyl esters of organic carboxylic acids, organic sulfonic acids such as p-toluene sulfonic acid and 4-dodecylbenzene sulfonic acid, sulfonic esters, other organic or inorganic acids, or mixtures of the aforementioned acids and acid esters.

Examples of catalysts K which accelerate the reaction of the isocyanate groups with water include organotin compounds such as dibutyltin dilaurate, dibutyltin dichloride, dibutyltin diacetylacetonate, organobismuth compounds or bismuth complexes, or compounds containing tertiary amino groups, such as 2,2'-dimorpholinodiethyl ether or 1,4-diazabicyclo[2.2.2]-octane, for example, or other catalysts, typical in polyurethane chemistry, for the reaction of the isocyanate groups.

It can be advantageous for the composition to include a mixture of two or more catalysts K, more particularly a mixture of an acidic compound and an organometallic compound or a metal complex, of an acidic compound and a compound containing tertiary amino groups, or a mixture of an acidic compound, an organometallic compound or a metal complex, and a compound containing tertiary amino groups.

A typical amount of catalyst K is customarily 0.005% to 2% by weight, based on the overall composition, it being clear to the person skilled in the art what amounts for use are sensible for which catalysts.

Present in the composition there may be, as further components, among others, the following auxiliaries and adjuvents:

plasticizers, examples being esters of organic carboxylic acids or their anhydrides, for example, phthalates such as dioctyl phthalate and diisodecyl phthalate, adipates such as dioctyl adipate, azelates and sebacates; organic phosphoric and sulfonic esters, and polybutenes;

fibers, of polyethylene, for example;

pigments, examples being titanium dioxide, iron oxides or chromium compounds;

further catalysts customary in polyurethane chemistry;

reactive diluents and crosslinkers, examples being polyisocyanates such as MDI, PMDI, TDI, HDI, 1,12-dodecamethylene diisocyanate, cyclohexane 1,3- or 1,4-diisocyanate, IPDI, perhydro-2,4'- and -4,4'-diphenylmethane diisocyanate, 1,3- and 1,4-tetramethylxylylene diisocyanate, oligomers and polymers of these polyisocyanates, adducts of polyisocyanates with short-chain polyols, and also adipic dihydrazide and other dihydrazides;

further latent curing agents such as, for example, other aldimines or oxazolidines;

dryers, such as, for example, p-tosyl isocyanate, orthoformic esters, calcium oxide, vinyltrimethoxysilane, and other quick-hydrolyzing silanes, such as, for example, organoalkoxysilanes which have a functional group in the position α to the silane group, and molecular sieves;

adhesion promoters, especially organoalkoxysilanes, called "silanes" below, such as epoxysilanes, vinylsilanes, (meth)acrylosilanes, isocyanatosilanes, carbamatosilanes, S-(alkylcarbonyl)mercaptosilanes and aldiminosilanes, for example, and also oligomeric forms of these silanes;

stabilizers to counter heat, light radiation, and UV radiation;

flame retardants;

surface-active substances such as wetting agents, flow control agents, deaerating agents or defoamers, for example;

biocides, such as algicides, fungicides or fungal growth inhibitors, for example;

and also further substances typically employed in one-component polyurethane compositions.

It is advantageous to ensure that not only the polyaldimine ALD but also any solvent L present, any filler F present, any catalyst K present, and also all further components that are present in the composition do not adversely affect the storage stability. In other words, during storage, they must not significantly initiate the reactions that lead to crosslinking, such as hydrolysis of the aldimine groups or crosslinking of the isocyanate groups. In particular this means that all of these components should contain no water, or traces of water at most. It can be sensible to carry out physical or chemical drying of certain components prior to their incorporation into the composition by mixing.

The composition is prepared and kept in the absence of moisture. It is storage-stable; that is, in a suitable pack or arrangement, such as in a drum, a pail or a pouch, for example, it can be kept for a time of several months up to a year or more in the absence of moisture without undergoing any service-relevant change in its performance properties or in its properties after curing. Typically the storage stability is determined via the measurement of the viscosity.

The composition preferably comprises further auxiliaries and additives, especially pigments, flow control agents, defoamers, stabilizers, and dryers.

A feature of the aldimine groups of the polyaldimine ALD is of hydrolyzing on contact with moisture. The isocyanate groups that are present in the composition react formally with the liberated polyamine of the formula (III), with release of the corresponding aldehydes of the formula (IV) or (V). Excess isocyanate groups in relation to the aldimine groups react with the water that is present. Ultimately, as a result of these reactions, the composition cures; this process is also referred to as crosslinking. The reaction of the isocyanate groups with the hydrolyzing polyaldimine ALD need not necessarily take place via the polyamine. It will be appreciated that reactions with intermediates of the hydrolysis of polyaldimine ALD to form the polyamine are also possible. It is conceivable, for example, for the hydrolyzing polyaldimine ALD to react in the form of a hemiaminal directly with the isocyanate groups.

The water that is needed for the curing reaction may in one case come from the air (atmospheric humidity), or else the composition may be contacted with a water-containing component, by being sprayed, for example, or else a water-containing component may be added to the composition at application.

The composition cures on contact with moisture. The rate of cure can be controlled via the type and amount of the catalysts K.

The aldehydes of the formula (IV) or (V) that have been liberated in the course of curing are of low volatility and remain in the cured position, without adversely affecting its service properties.

The composition has a liquid consistency with good flow properties. As a result it can easily be applied as a self-leveling coating to predominantly planar surfaces—as a floor covering, for example. The composition may be applied in two or more layers. The layer thickness applied per layer is usually from 0.5 to 3 mm, more particularly 0.5 to 2 mm.

In the cured state the composition possesses elastic properties and a comparatively high hardness. Typically the cured composition has an elongation at break in the range from 30% to 700%, a tensile strength in the range from 3 to 10 $N/mm^2$, and a Shore A hardness in the range from 45 to 90.

The aging stability of the composition is good, even under the influence of heat, moisture, and UV light. When exclusively aliphatic isocyanate groups are used in the composition, coatings are obtained which do not discolor on exposure to light.

A floor covering is frequently a construction in a plurality of different layers. One typical construction may begin, for example, with what is called a primer, whose function is to prepare the substrate for the elastic polyurethane coating. Subsequently, for example, the composition described is applied as an elastic layer, it being possible for this application to take place in one or more operations, according to the nature of the substrate and the desired layer thickness. Then, finally, a so-called sealer can be applied, which in a thin layer, as for example in a thickness ranging from a few micrometers up to several tenths of millimeters, further influences the surface quality of the floor covering. This sealer may be transparent or pigmented. It is also possible, over a cured layer of an inventive composition that has a high breaking extension, to apply a so-called wear course. In this way a covering is formed which features good dynamic crack-bridging and high surface hardness, the inventive composition, with its high elasticity, ensuring the crack-bridging, and the wear course providing for the high surface hardness. The wear course in turn may also be sealed if required. In this way it is possible to obtain floor constructions in accordance with OS 11 as per the "Guidelines for Protection and Repair of Concrete Components" of the German Reinforced Concrete Committee, where "OS" stands for "Oberflächenschutzsystem" [Surface protection system].

It is also possible for the composition described to be mixed, prior to application, with a further filler, more particularly quartz sand. It is likewise possible for only the surface of the composition, while still liquid, to be scattered with quartz sand or to have quartz sand scattered into it. In both ways, a sandy, highly slip-resistant, abrasion-resistant surface is obtained which can be sealed as and when required.

Where sloping surfaces are to be coated with the composition described, it is possible to mix what is called a standardizer into the composition, prior to application, this standardizer being in the form of a filler which thickens the composition, as in the form of polyethylene fibers, for example.

The composition described is applied typically by being poured onto the substrate to be coated, and it is spread evenly in the liquid state with the aid, for example, of a coating knife or of a toothed trowel. Additionally the material may be leveled and deaerated using a barbed roller. Also possible, however, is application by machine, in the form of a spray application, for example.

A suitable substrate to which the composition is typically applied is, for example, concrete, cement, asphalt, steel, wood, ceramic or a plastic, it being possible for the substrate to have been pretreated by cleaning, brushing or sandblasting, and/or to have a primer. Examples of suitable primers include adhesion promoter solutions or undercoats.

The composition described is specially suitable as a coating or covering, more particularly in the interior or exterior area of a building or of a built structure, such as, for example, as a floor covering for internal spaces such as offices, industrial halls, gymnasiums or chill rooms, or, in the exterior area, for balconies, patios, bridges, parking decks, or sports grounds and playgrounds.

EXAMPLES

Description of the Test Methods

The viscosity was measured on a Physica UM thermostated cone/plate viscometer (cone diameter 20 mm, cone angle 1°, cone tip/plate distance 0.05 mm, shear rate 10 to 1000 s$^{-1}$).

The Shore A hardness was determined in accordance with DIN 53505.

The tensile strength and the elongation at break were determined in accordance with DIN 53504 (pulling speed: 200 mm/min) on films with a thickness of 1.1 mm that had been cured under standard conditions (23±1° C., 50±5% relative atmospheric humidity) for 14 days.

Raw Materials Used

| | |
|---|---|
| Desmophen ® 1111 BD | Bayer; polyoxypropylenediol having an OH number of 111.4 mg KOH/g and a water content of 0.02% by weight. |
| Desmophen ® 2061 BD | Bayer; polyoxypropylenediol having an OH number of 56.1 mg KOH/g and a water content of 0.02% by weight. |
| Vestanat ® IPDI | Degussa; isophorone diisocyanate (IPDI), NCO equivalent weight = 111.1 g/eq |
| Desmodur ® XP 2599 | Bayer; polyether-polyurethane prepolymer based on HDI with 6.0% by weight NCO and a viscosity of about 3 Pa · s. |
| Desmodur ® N 3600 | Bayer; isocyanurate of hexamethylene diisocyanate (HDI), contains 23% by weight NCO |
| Desmodur ® Z 4470 | Bayer; 70% by weight of isocyanurate from isophorone diisocyanate (IPDI) in Solvesso 100, contains 11.9% by weight NCO. | a) Preparation of the Polyurethane Polymer P1

In the absence of moisture, 1060 g of Desmophen® 1111 BD, 650 g of Desmophen® 2061 BD, 770 g of Vestanat® IPDI, and 0.25 g of dibutyltin dilaurate were stirred at 80° C. until the isocyanate content of the mixture had a constant value of 6.7% by weight. The resulting polymer was cooled to room temperature and stored in the absence of moisture. It had a viscosity of 11.6 Pa·s at 20° C.

b) Preparation of the Polyaldimine ALD1

A round-bottomed flask was charged under a nitrogen atmosphere with 298.7 g (1.05 mol) of 2,2-dimethyl-3-lauroyloxypropanal. With vigorous stirring, 58.1 g (0.50 mol) of 1,6-hexamethylenediamine were added slowly from a heated dropping funnel. Thereafter, at 80° C., the volatile constituents were removed completely by vacuum distillation. This gave 338.2 g of yellowish reaction product, liquid at room temperature, with an aldimine content, determined as the amine content, of 2.95 mmol NH$_2$/g and with a viscosity of 78 mPa·s at 20° C.

c) Preparation of Unfilled Compositions

Example 1

30 parts by weight of Desmodur® XP 2599 (viscosity 3.7 Pa·s at 20° C.) and 1.5 parts by weight of Desmodur® N 3600 were mixed with one another. The viscosity of this mixture was 3.6 Pa·s at 20° C.

Subsequently 12 parts by weight of the polyaldimine ALD1 were mixed in homogeneously. The viscosity of this mixture was 1.26 Pa·s at 20° C.

Example 2

24.85 parts by weight of the polyurethane polymer P1 and 8 parts by weight of Desmodur® Z 4470 were mixed with one another. The viscosity of this mixture was 7.5 Pa·s at 20° C.

Subsequently 12 parts by weight of the polyaldimine ALD1 were mixed in homogeneously. The viscosity of this mixture was 1.66 Pa·s at 20° C.

Examples 1 and 2 show the good diluent effect of a polyaldimine of the formula (I) in a mixture with in each case a polyurethane polymer P and an oligomeric polyisocyanate OP.

d) Preparation of Filled Compositions, Application as Coating

Example 3

The composition of example 3 is suitable as a one-component, odorlessly curing, VOC-free, and yellowing-resistant coating, for example, as an elastic floor covering in the interior area.

In a vacuum mixer, 300 g of Desmodur® XP 2599, 15 g of Desmodur® N 3600, 5 g of p-toluenesulfonyl isocyanate, 500.4 g of dry barytes (natural barium sulfate), 4 g of Tego® Foamex N (Tego Chemie), 1.6 g of benzoic acid, 4 g of Byk® A 555 (Byk Chemie), 40 g of titanium dioxide, 10 g of Tinuvin® 292 (Ciba), and 120 g of polyaldimine ALD1 were processed to a homogeneous, fluid composition which was stored in the absence of moisture.

The viscosity of the composition was 3 Pa·s at 20° C.

The composition was poured in a layer thickness of 1.1 mm onto a flat PTFE substrate and left at 23° C. and 50% relative humidity. 24 hours after application, a tack-free, elastic coating had formed which, after having cured for 7 days at 23° C. and 50% relative atmospheric humidity, had a Shore A hardness of 80,
a tensile strength of 5.8 N/mm$^2$, and
an elongation at break of 50%.

Example 4

The composition of example 4 is suitable as a one-component, low-VOC, and yellowing-resistant coating based on polyurethane, for example, as an elastic floor covering in the exterior area, having crack-bridging properties, for example, as a balcony coating.

In a vacuum mixer, 250 g of polyurethane polymer P1, 80 g of Desmodur® Z 4470, 10 g of xylene, 479 g of dry barytes (natural barium sulfate), 4 g of Tego® Foamex N (Tego Chemie), 1.6 g of benzoic acid, 4 g of Byk® A 555 (Byk Chemie), 40 g of titanium dioxide, 10 g of Tinuvin® 292 (Ciba), 1.4 g of dibutyltin dilaurate, and 120 g of polyaldimine ALD1 were processed to a homogeneous, fluid composition which was stored in the absence of moisture.

The viscosity of the composition was 4.5 Pa·s at 20° C.

The composition was poured in a layer thickness of 1.1 mm onto a flat PTFE substrate and left at 23° C. and 50% relative humidity. 24 hours after application, a tack-free, elastic coating had formed which, after having cured for 7 days at 23° C. and 50% relative atmospheric humidity, had a Shore A hardness of 65,
a tensile strength of 4.5 N/mm², and
an elongation at break of 390%.

The invention claimed is:

1. A moisture-curing composition comprising
   a) at least one polyurethane polymer P containing isocyanate groups;
   b) at least one polyaldimine ALD of the formula (I):

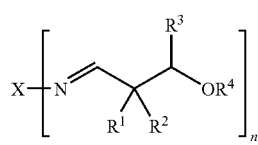

(I)

c) optionally, an oligomeric polyisocyanate OP
   where:
   X is an organic radical of a polyamine carrying n $NH_2$ groups having a molecular weight of not more than 300 g/mol, following removal of all of the $NH_2$ groups, and the organic radical does not contain any moieties which in the absence of water are reactive with isocyanate groups;
   n is 2 to 4;
   $R^1$ and $R^2$ are each a monovalent hydrocarbon radical having 1 to 12 C atoms; or
   $R^1$ and $R^2$ collectively are a divalent hydrocarbon radical having 4 to 20 C atoms and are a part of an unsubstituted or substituted carbocyclic ring having 5 to 8 C atoms;
   $R^3$ is a hydrogen atom or is an alkyl or arylalkyl group; and
   $R^4$ either is a hydrocarbon radical which has 11 to 30 C atoms and optionally contains heteroatoms, or is a radical of the formula (II):

(II)

where:
   $R^5$ alternatively is a linear or branched alkyl radical having 11 to 30 C atoms, optionally with cyclic fractions and optionally with at least one heteroatom, or is a singly or multiply unsaturated, linear or branched hydrocarbon radical having 11 to 30 C atoms, or is an unsubstituted or substituted aromatic or heteroaromatic 5- or 6-membered ring; and
   where:
   the fraction of the polyaldimine ALD of the formula (I) is in an amount of at least 22% by weight, based on the sum of the constituents of the composition that contain isocyanate groups.

2. The moisture-curing composition of claim 1, wherein n is 2 or 3.

3. The moisture-curing composition of claim 1, wherein X is one of the amines selected from the group consisting of hexamethylenediamine, 5-diamino-2-methylpentane (MPMD), 1,3-diaminopentane (DAMP), 1-amino-3-aminomethyl-3,5,5-trimethylcyclohexane, 4-aminomethyl-1,8-octanediamine, 1,3-xylylenediamine, 1,3-bis(aminomethyl)cyclohexane, bis(4-aminocyclohexyl)methane, bis(4-amino-3-methylcyclohexyl)methane, 3(4),8(9)-bis(aminomethyl)tricyclo-[5.2.1.0$^{2,6}$]decane, 1,4-diamino-2,2,6-trimethylcyclohexane, polyoxyalkylene-polyamines having two or three amino groups, and mixtures of two or more of the aforementioned polyamines, wherein the selected amine has a molecular weight of not more than 300 g/mol following removal of all $NH_2$ groups of the selected amine.

4. The moisture-curing composition of claim 1, wherein X is 1,6-hexamethylenediamine, having a molecular weight of not more than 300 g/mol following removal of both $NH_2$ groups of the 1,6-hexamethylenediamine.

5. The moisture-curing composition of claim 1, wherein $R^1$ and $R^2$ are each a methyl group.

6. The moisture-curing composition of claim 1, wherein $R^3$ is a hydrogen atom.

7. The moisture-curing composition of claim 1, wherein $R^4$ is a radical of the formula (II), $R^5$ being selected from the group consisting of phenyl and $C_{11}$, $C_{13}$, $C_{15}$, and $C_{17}$ alkyl groups.

8. The moisture-curing composition of claim 1, wherein the fraction of the polyurethane polymer P containing isocyanate groups is in an amount of 10% to 80% by weight, based on the overall composition.

9. The moisture-curing composition of claim 1, wherein the polyurethane polymer P containing isocyanate groups is prepared from a polyol and an aliphatic polyisocyanate.

10. The moisture-curing composition of claim 1, wherein the fraction of the polyaldimine ALD of the formula (I) is in an amount of at least 25% by weight, based on the sum of the constituents of the composition that contain isocyanate groups.

11. The moisture-curing composition of claim 1, wherein the fraction of the oligomeric polyisocyanate OP is in an amount of 0.5% to 20% by weight, based on the overall composition.

12. The moisture-curing composition of claim 1, wherein the oligomeric polyisocyanate OP is an aliphatic oligomeric polyisocyanate.

13. The moisture-curing composition of claim 1, wherein the composition contains no solvent.

14. The moisture-curing composition of claim 1, wherein the composition contains up to an amount of 5% by weight of a solvent, based on the overall composition.

15. The moisture-curing composition of claim 14, wherein the solvent is selected from the group consisting of xylene, toluene, white spirit, and petroleum fractions, wherein the petroleum fractions are in a boiling range of from 100° C. to 200° C.

16. The moisture-curing composition of claim 1, wherein the composition comprises at least one filler in an amount of from 10% to 70% by weight, based on the overall composition.

17. The moisture-curing composition of claim 16, wherein the filler is barium sulfate or a calcium carbonate.

18. The moisture-curing composition of claim 16, wherein the filler is a flame-retardant filler.

19. The moisture-curing composition of claim 1, wherein the composition is self-leveling at room temperature.

20. A cured composition obtained from the reaction of water, in the form of atmospheric moisture, with a moisture-curing composition of claim 1.

21. A covering or a coating comprising the moisture-curing composition of claim 1.

22. An interior or exterior of a building or of a built structure comprising the covering or the coating of claim 21.

23. A method of producing a coating, comprising:
applying a moisture-curing composition of claim 1 to a substrate; and
curing the applied moisture-curing composition by means of water, in the form of atmospheric moisture.

24. The method of claim 23, wherein the substrate is concrete, cement, asphalt, steel, wood, ceramic, or a plastic.

25. The method of claim 23, wherein the substrate has a primer coat.

26. The method of claim 23, wherein applying a moisture-curing composition takes place a plurality of times in succession.

27. The method of claim 23, wherein the method further comprises applying a sealing coating, which takes place after applying the moisture-curing composition.

28. The method of claim 23, wherein the method further comprises introducing quartz sand, by scattering, which takes place after applying the moisture-curing composition and before curing the composition.

29. A covering or coating obtained by the method of claim 23.

30. A building or built structure comprising the covering or the coating of claim 29.

31. A method of diluting polyurethane polymers containing isocyanate groups, comprising:
diluting the polyurethane polymers containing isocyanate groups with at least one polyaldimine ALD of the formula (I):

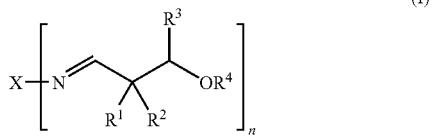

where:
X is an organic radical of a polyamine carrying n $NH_2$ groups having a molecular weight of not more than 300 g/mol, following removal of all of the $NH_2$ groups, and the organic radical does not contain any moieties which in the absence of water are reactive with isocyanate groups;
n is 2 to 4;
$R^1$ and $R^2$ are each a monovalent hydrocarbon radical having 1 to 12 C atoms; or
$R^1$ and $R^2$ collectively are a divalent hydrocarbon radical having 4 to 20 C atoms and are a part of an unsubstituted or substituted carbocyclic ring having 5 to 8 C atoms;
$R^3$ is a hydrogen atom or is an alkyl or arylalkyl group; and
$R^4$ either is a hydrocarbon radical which has 11 to 30 C atoms and optionally contains heteroatoms, or is a radical of the formula (II):

where:
$R^5$ alternatively is a linear or branched alkyl radical having 11 to 30 C atoms, optionally with cyclic fractions and optionally with at least one heteroatom, or is a singly or multiply unsaturated, linear or branched hydrocarbon radical having 11 to 30 C atoms, or is an unsubstituted or substituted aromatic or heteroaromatic 5- or 6-membered ring.

32. A method of substituting solvents in compositions which comprise polyurethane polymers containing isocyanate groups, comprising:
substituting the solvents in the compositions which comprise polyurethane polymers containing isocyanate groups with at least one polyaldimine ALD of the formula (I):

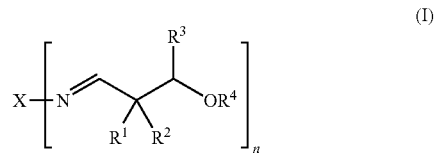

where:
X is an organic radical of a polyamine carrying n $NH_2$ groups having a molecular weight of not more than 300 g/mol, following removal of all of the $NH_2$ groups, and the organic radical does not contain any moieties which in the absence of water are reactive with isocyanate groups;
n is 2 to 4;
$R^1$ and $R^2$ are each a monovalent hydrocarbon radical having 1 to 12 C atoms; or
$R^1$ and $R^2$ collectively are a divalent hydrocarbon radical having 4 to 20 C atoms and are a part of an unsubstituted or substituted carbocyclic ring having 5 to 8 C atoms;
$R^3$ is a hydrogen atom or is an alkyl or arylalkyl group; and
$R^4$ either is a hydrocarbon radical which has 11 to 30 C atoms and optionally contains heteroatoms, or is a radical of the formula (II)

where:
$R^5$ alternatively is a linear or branched alkyl radical having 11 to 30 C atoms, optionally with cyclic fractions and optionally with at least one heteroatom, or is a singly or multiply unsaturated, linear or branched hydrocarbon radical having 11 to 30 C atoms, or is an unsubstituted or substituted aromatic or heteroaromatic 5- or 6-membered ring.

* * * * *